United States Patent
Wajda et al.

(10) Patent No.: US 12,418,837 B2
(45) Date of Patent: Sep. 16, 2025

(54) RESOURCE BALANCING

(71) Applicant: NOKIA SOLUTIONS AND NETWORKS OY, Espoo (FI)

(72) Inventors: Wieslawa Wajda, Keltern (DE); Jing Ping, Sichuan (CN)

(73) Assignee: Nokia Solutions and Networks Oy, Espoo (FI)

( * ) Notice: Subject to any disclaimer, the term of this patent is extended or adjusted under 35 U.S.C. 154(b) by 465 days.

(21) Appl. No.: 17/766,652

(22) PCT Filed: Oct. 14, 2019

(86) PCT No.: PCT/CN2019/110981
§ 371 (c)(1),
(2) Date: Apr. 5, 2022

(87) PCT Pub. No.: WO2021/072589
PCT Pub. Date: Apr. 22, 2021

(65) Prior Publication Data
US 2023/0232283 A1    Jul. 20, 2023

(51) Int. Cl.
H04W 28/24    (2009.01)
H04W 48/18    (2009.01)

(52) U.S. Cl.
CPC ........... *H04W 28/24* (2013.01); *H04W 48/18* (2013.01)

(58) Field of Classification Search
None
See application file for complete search history.

(56) References Cited

U.S. PATENT DOCUMENTS

| 6,701,342 | B1 | 3/2004 | Bartz et al. | |
|---|---|---|---|---|
| 2007/0083650 | A1* | 4/2007 | Collomb | G06Q 10/04 709/224 |
| 2013/0007272 | A1 | 1/2013 | Breitgand et al. | |
| 2015/0355925 | A1 | 12/2015 | Hiebert et al. | |
| 2018/0247215 | A1* | 8/2018 | Garvey | G06N 20/00 |
| 2022/0166667 | A1* | 5/2022 | Celozzi | H04L 63/12 |

FOREIGN PATENT DOCUMENTS

WO    WO 2012/111993 A2    8/2012

OTHER PUBLICATIONS

U.S. Pat. No. 6,701,342 Specification with Paragraphs (Year: 2004).*
International Search Report and Written Opinion dated Jul. 16, 2020 corresponding to International Patent Application No. PCT/CN2019/110981.
3GPP TS 28.541 V16.2.0 (Sep. 2019), Technical Specification, 3rd Generation Partnership Project, Technical Specification Group Services and System Aspects; Management and orchestration; 5G Network Resource Model (NRM); Stage 2 and stage 3 (Release 16), Sep. 2019.

* cited by examiner

*Primary Examiner* — Jenkey Van
(74) *Attorney, Agent, or Firm* — Barta Jones, PLLC

(57) ABSTRACT

There is disclosed an apparatus. The apparatus comprises means for performing: in response to determining a lack of resource or an impending lack of resource in a communication network, determining whether an agreed level of service for one or more service requirements of one or more services will be affected; and when it is determined that the agreed level of service for one or more service requirements of one or more services will be affected, determining whether one or more customers can tolerate non-compliance with the agreed level of service.

13 Claims, 7 Drawing Sheets

S1: In response to determining a lack of resource or an impending lack of resource in a communication network, determining whether an agreed level of service for one or more service requirements of one or more services will be affected S2: When it is determined that the agreed level of service for one or more service requirements of one or more services will be affected, determining whether one or more customers can tolerate non-compliance with the agreed level of service

RESOURCE BALANCING

FIELD

This disclosure relates to communications, and more particularly to resource balancing in a wireless communication system.

BACKGROUND

A communication system can be seen as a facility that enables communication between two or more devices such as user terminals, machine-like terminals, base stations and/or other nodes by providing communication channels for carrying information between the communicating devices. A communication system can be provided for example by means of a communication network and one or more compatible communication devices. The communication may comprise, for example, communication of data for carrying data for voice, electronic mail (email), text message, multimedia and/or content data communications and so on. Non-limiting examples of services provided include two-way or multi-way calls, data communication or multimedia services and access to a data network system, such as the Internet.

In a wireless system at least a part of communications occurs over wireless interfaces. Examples of wireless systems include public land mobile networks (PLMN), satellite based communication systems and different wireless local networks, for example wireless local area networks (WLAN). A local area wireless networking technology allowing devices to connect to a data network is known by the tradename WiFi (or Wi-Fi). WiFi is often used synonymously with WLAN. The wireless systems can be divided into cells, and are therefore often referred to as cellular systems. A base station provides at least one cell.

A user can access a communication system by means of an appropriate communication device or terminal capable of communicating with a base station. Hence nodes like base stations are often referred to as access points. A communication device of a user is often referred to as user equipment (UE). A communication device is provided with an appropriate signal receiving and transmitting apparatus for enabling communications, for example enabling communications with the base station and/or communications directly with other user devices. The communication device can communicate on appropriate channels, e.g. listen to a channel on which a station, for example a base station of a cell, transmits.

A communication system and associated devices typically operate in accordance with a given standard or specification which sets out what the various entities associated with the system are permitted to do and how that should be achieved. Communication protocols and/or parameters which shall be used for the connection are also typically defined. Non-limiting examples of standardised radio access technologies include GSM (Global System for Mobile), EDGE (Enhanced Data for GSM Evolution) Radio Access Networks (GERAN), Universal Terrestrial Radio Access Networks (UTRAN) and evolved UTRAN (E-UTRAN). An example communication system architecture is the long-term evolution (LTE) of the Universal Mobile Telecommunications System (UMTS) radio-access technology. The LTE is standardized by the third Generation Partnership Project (3GPP). The LTE employs the Evolved Universal Terrestrial Radio Access Network (E-UTRAN) access and a further development thereof which is sometimes referred to as LTE Advanced (LTE-A).

Since introduction of fourth generation (4G) services increasing interest has been paid to the next, or fifth generation (5G) standard. 5G may also be referred to as a New Radio (NR) network. Standardization of 5G or New Radio networks has been finalized in 3GPP release 15.

In some networks, such as 5G networks, a network may comprise one or more network slices.

SUMMARY

According to a first aspect there is provided an apparatus comprising means for performing: in response to determining a lack of resource or an impending lack of resource in a communication network, determining whether an agreed level of service for one or more service requirements of one or more services will be affected; and when it is determined that the agreed level of service for one or more service requirements of one or more services will be affected, determining whether one or more customers can tolerate non-compliance with the agreed level of service.

According to an example, the means are further configured to perform allowing non-compliance with the agreed level of service for those customers that can tolerate the non-compliance.

According to an example, the means are further configured to perform preventing non-compliance with the agreed level of service for those customers that cannot tolerate the non-compliance.

According to an example, the means are further configured to perform looking up a tolerance indicator for the one or more customers when determining whether one or more customers can tolerate non-compliance with the agreed level of service.

According to an example, the tolerance indicator is associated with one or more of the one or more service requirements of the one or more services.

According to an example, the tolerance indicator indicates at least one or more of: a tolerance range for the agreed level of service; a tolerance duration of non-compliance with the agreed level of service; compensation for accepting non-compliance with the agreed level of service.

According to an example, the one or more service requirements comprise at least one or more of: data rate; packet loss; coverage; user mobility; service availability; reliability.

According to an example, the communication network comprises at least one or more: network slices; network slice subnets; network services; network functions; network function services.

According to an example, the apparatus comprises an entity of a network service provider.

According to an example, the means comprises at least one processor; and at least one memory including computer program code, the at least one memory and computer program code configured to, with the at least one processor, cause the performance of the apparatus.

According to a second aspect there is provided an apparatus comprising at least one processor; and at least one memory including computer program code; the at least one memory and the computer program code configured to, with the at least one processor, cause the apparatus at least to perform: in response to determining a lack of resource or an impending lack of resource in a communication network, determining whether an agreed level of service for one or more service requirements of one or more services will be affected; and when it is determined that the agreed level of service for one or more service requirements of one or more services will be affected, determining whether one or more customers can tolerate non-compliance with the agreed level of service.

According to an example, the at least one memory and the computer program code are configured to, with the at least one processor, cause the apparatus at least to perform: allowing non-compliance with the agreed level of service for those customers that can tolerate the non-compliance.

According to an example, the at least one memory and the computer program code are configured to, with the at least one processor, cause the apparatus at least to perform: preventing non-compliance with the agreed level of service for those customers that cannot tolerate the non-compliance.

According to an example, the at least one memory and the computer program code are configured to, with the at least one processor, cause the apparatus at least to perform: looking up a tolerance indicator for the one or more customers when determining whether one or more customers can tolerate non-compliance with the agreed level of service.

According to an example, the tolerance indicator is associated with one or more of the one or more service requirements of the one or more services.

According to an example, the tolerance indicator indicates at least one or more of: a tolerance range for the agreed level of service; a tolerance duration of non-compliance with the agreed level of service; compensation for accepting non-compliance with the agreed level of service.

According to an example, the one or more service requirements comprise one or more of: data rate; packet loss; coverage; user mobility; service availability; reliability.

According to an example, the communication network comprises at least one or more: network slices; network slice subnets; network services; network functions; network function services.

According to an example, the apparatus comprises an entity of a network service provider.

According to a third aspect there is provided an apparatus comprising: determining circuitry for, in response to determining a lack of resource or an impending lack of resource in a communication network, determining whether an agreed level of service for one or more service requirements of one or more services will be affected; and determining circuitry for, when it is determined that the agreed level of service for one or more service requirements of one or more services will be affected, determining whether one or more customers can tolerate non-compliance with the agreed level of service.

According to a fourth aspect there is provided a method comprising: in response to determining a lack of resource or an impending lack of resource in a communication network, determining whether an agreed level of service for one or more service requirements of one or more services will be affected; and when it is determined that the agreed level of service for one or more service requirements of one or more services will be affected, determining whether one or more customers can tolerate non-compliance with the agreed level of service.

According to an example, the method comprises allowing non-compliance with the agreed level of service for those customers that can tolerate the non-compliance.

According to an example, the method comprises preventing non-compliance with the agreed level of service for those customers that cannot tolerate the non-compliance.

According to an example, the method comprises looking up a tolerance indicator for the one or more customers when determining whether one or more customers can tolerate non-compliance with the agreed level of service.

According to an example, the tolerance indicator is associated with one or more of the one or more service requirements of the one or more services.

According to an example, the tolerance indicator indicates at least one or more of: a tolerance range for the agreed level of service; a tolerance duration of non-compliance with the agreed level of service; compensation for accepting non-compliance with the agreed level of service.

According to an example, the one or more service requirements comprise at least one or more of: data rate; packet loss; coverage; user mobility; service availability; reliability.

According to an example, the communication network comprises at least one or more: network slices; network slice subnets; network services; network functions; network function services.

According to an example, the method is carried out by an entity of a network service provider.

According to a fifth aspect there is provided a computer program comprising instructions for causing an apparatus to perform at least the following: in response to determining a lack of resource or an impending lack of resource in a communication network, determining whether an agreed level of service for one or more service requirements of one or more services will be affected; and when it is determined that the agreed level of service for one or more service requirements of one or more services will be affected, determining whether one or more customers can tolerate non-compliance with the agreed level of service.

According to a sixth aspect there is provided a computer program comprising instructions stored thereon for performing at least the following: in response to determining a lack of resource or an impending lack of resource in a communication network, determining whether an agreed level of service for one or more service requirements of one or more services will be affected; and when it is determined that the agreed level of service for one or more service requirements of one or more services will be affected, determining whether one or more customers can tolerate non-compliance with the agreed level of service.

According to a seventh aspect there is provided a non-transitory computer readable medium comprising program instructions for causing an apparatus to perform at least the following: in response to determining a lack of resource or an impending lack of resource in a communication network, determining whether an agreed level of service for one or more service requirements of one or more services will be affected; and when it is determined that the agreed level of service for one or more service requirements of one or more services will be affected, determining whether one or more customers can tolerate non-compliance with the agreed level of service.

According to an eighth aspect there is provided a non-transitory computer readable medium comprising program instructions stored thereon for performing at least the following: in response to determining a lack of resource or an impending lack of resource in a communication network, determining whether an agreed level of service for one or more service requirements of one or more services will be affected; and when it is determined that the agreed level of service for one or more service requirements of one or more services will be affected, determining whether one or more customers can tolerate non-compliance with the agreed level of service.

According to a ninth aspect there is provided an apparatus comprising means for performing: receiving a network slice instance allocation or modification request from a consumer of a network slice instance; determining whether the allocation or modification is feasible; and sending information to the consumer, the information comprising a proposal for tolerance of non-compliance with an agreed level of service by the consumer.

According to an example, the means are further configured to perform receiving, from the consumer, approval or disapproval of the proposed tolerance of non-compliance.

According to an example, the means are further configured to perform allocating or updating the network slice instance.

According to an example, the means comprises at least one processor; and at least one memory including computer program code, the at least one memory and computer program code configured to, with the at least one processor, cause the performance of the apparatus.

According to a tenth aspect there is provided an apparatus comprising at least one processor; and at least one memory including computer program code; the at least one memory and the computer program code configured to, with the at least one processor, cause the apparatus at least to perform: receiving a network slice instance allocation or modification request from a consumer of a network slice instance; determining whether the allocation or modification is feasible; and sending information to the consumer, the information comprising a proposal for tolerance of non-compliance with an agreed level of service by the consumer.

According to an example, the at least one memory and the computer program code are configured to, with the at least one processor, cause the apparatus at least to perform: receiving, from the consumer, approval or disapproval of the proposed tolerance of non-compliance.

According to an example, the at least one memory and the computer program code are configured to, with the at least one processor, cause the apparatus at least to perform: allocating or updating the network slice instance.

According to an eleventh aspect there is provided an apparatus comprising: receiving circuitry for receiving a network slice instance allocation or modification request from a consumer of a network slice instance; determining circuitry for determining whether the allocation or modification is feasible; and sending circuitry for sending information to the consumer, the information comprising a proposal for tolerance of non-compliance with an agreed level of service by the consumer.

According to a twelfth aspect there is provided a method comprising: receiving a network slice instance allocation or modification request from a consumer of a network slice instance; determining whether the allocation or modification is feasible; and sending information to the consumer, the information comprising a proposal for tolerance of non-compliance with an agreed level of service by the consumer.

According to an example, the method comprises receiving, from the consumer, approval or disapproval of the proposed tolerance of non-compliance.

According to an example, the method comprises allocating or updating the network slice instance.

According to a thirteenth aspect there is provided a computer program comprising instructions for causing an apparatus to perform at least the following: receiving a network slice instance allocation or modification request from a consumer of a network slice instance; determining whether the allocation or modification is feasible; and sending information to the consumer, the information comprising a proposal for tolerance of non-compliance with an agreed level of service by the consumer.

According to a fourteenth aspect there is provided a computer program comprising instructions stored thereon for performing at least the following: receiving a network slice instance allocation or modification request from a consumer of a network slice instance; determining whether the allocation or modification is feasible; and sending information to the consumer, the information comprising a proposal for tolerance of non-compliance with an agreed level of service by the consumer.

According to a fifteenth aspect there is provided a non-transitory computer readable medium comprising program instructions for causing an apparatus to perform at least the following: receiving a network slice instance allocation or modification request from a consumer of a network slice instance; determining whether the allocation or modification is feasible; and sending information to the consumer, the information comprising a proposal for tolerance of non-compliance with an agreed level of service by the consumer.

According to an sixteenth aspect there is provided a non-transitory computer readable medium comprising program instructions stored thereon for performing at least the following: receiving a network slice instance allocation or modification request from a consumer of a network slice instance; determining whether the allocation or modification is feasible; and sending information to the consumer, the information comprising a proposal for tolerance of non-compliance with an agreed level of service by the consumer.

According to a seventeenth aspect there is provided an apparatus comprising means for performing: sending a network slice instance allocation or modification request to a provider of the network slice instance; receiving a proposal for tolerance of non-compliance with an agreed level of service by the apparatus; and sending approval or disapproval of the proposed tolerance of non-compliance to the provider.

According to an example, the means comprises at least one processor; and at least one memory including computer program code, the at least one memory and computer program code configured to, with the at least one processor, cause the performance of the apparatus.

According to an eighteenth aspect there is provided an apparatus comprising at least one processor; and at least one memory including computer program code; the at least one memory and the computer program code configured to, with the at least one processor, cause the apparatus at least to perform: sending a network slice instance allocation or modification request to a provider of the network slice instance; receiving a proposal for tolerance of non-compliance with an agreed level of service by the apparatus; and sending approval or disapproval of the proposed tolerance of non-compliance to the provider.

According to a nineteenth aspect there is provided an apparatus comprising: sending circuitry for sending a network slice instance allocation or modification request to a provider of the network slice instance; receiving circuitry for receiving a proposal for tolerance of non-compliance with an agreed level of service by the apparatus; and sending circuitry for sending approval or disapproval of the proposed tolerance of non-compliance to the provider.

According to a twentieth aspect there is provided a method comprising: sending a network slice instance allocation or modification request to a provider of the network slice instance; receiving a proposal for tolerance of non-compliance with an agreed level of service; and sending approval or disapproval of the proposed tolerance of non-compliance to the provider.

According to a twenty first aspect there is provided a computer program comprising instructions for causing an apparatus to perform at least the following: sending a network slice instance allocation or modification request to a provider of the network slice instance; receiving a proposal for tolerance of non-compliance with an agreed level of service; and sending approval or disapproval of the proposed tolerance of non-compliance to the provider.

According to a twenty second aspect there is provided a computer program comprising instructions stored thereon for performing at least the following: sending a network slice instance allocation or modification request to a provider of the network slice instance; receiving a proposal for tolerance of non-compliance with an agreed level of service; and sending approval or disapproval of the proposed tolerance of non-compliance to the provider.

According to a twenty third aspect there is provided a non-transitory computer readable medium comprising program instructions for causing an apparatus to perform at least the following: sending a network slice instance allocation or modification request to a provider of the network slice instance; receiving a proposal for tolerance of non-compliance with an agreed level of service; and sending approval or disapproval of the proposed tolerance of non-compliance to the provider.

According to a twenty fourth aspect there is provided a non-transitory computer readable medium comprising program instructions stored thereon for performing at least the following: sending a network slice instance allocation or modification request to a provider of the network slice instance; receiving a proposal for tolerance of non-compliance with an agreed level of service; and sending approval or disapproval of the proposed tolerance of non-compliance to the provider.

DETAILED DESCRIPTION

A network may be divided into network "slices". For example, 3GPP Release 15 (Rel-15) describes network slicing of a mobile 5G network. Network slicing may be used for applications in an internet protocol (IP) multimedia subsystem (IMS).

Each network slice of a network maybe considered to be a virtualized and independent logical network on the same physical network infrastructure of the network. Each network slice may comprise an isolated end-to-end network adapted to fulfil requirements requested by a particular application.

Figure 1:
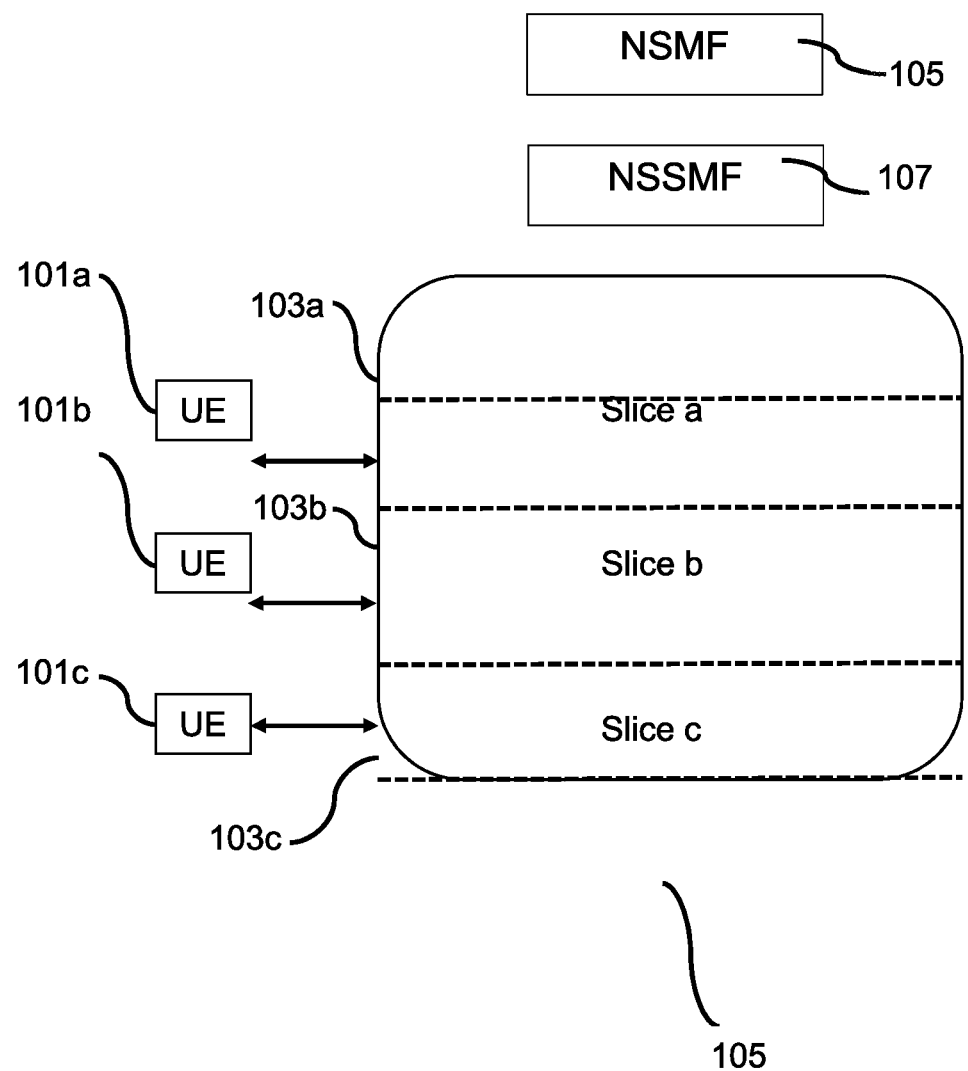
FIG. 1 schematically shows the principle of network slicing.

In an exemplary scenario as shown in FIG. 1, a network 105 may comprise 3 slices: Slice a 103*a*; Slice b 103*b*; and Slice c 103*c*. It will be understood that in other examples, the network may comprise fewer or more network slices.

Each network slice 103*a*, 103*b* and 103*c* of FIG. 1 may be used for a different application. For example, slice a 103*a* may be used by User Equipment (UE) 101*a* to be compliant with 3GPP eMBB (extended mobile Broadband Communication), slice b 103*b* may be used by UE 101*b* for Internet of Things (IoT) communications and slice c 103*c* may be used by UE 101*c* to be compliant with 3GPP URLLC (Ultra Reliable Low Latency Communication). Another exemplary application that could use a network slice may be, for example, machine-to-machine communications. These applications are listed for exemplary purposes only to assist with the understanding of network slicing, and are non-limiting.

In communication networks, contracts between a Service Provider (e.g. mobile network operator (MNO)) and a Service Customer (i.e. a customer of the MNO which could be for example an end user) is described with the help of Service Level Agreements (SLAs). Thus in some examples a "customer" may be considered a "user" of the service. It will also be understood that the term "customer" may refer to the apparatus of a customer. For example where it is discussed that service level of a customer is being affected, this may also be considered to mean that service level of an apparatus (e.g. UE, base station etc.) is being affected. A customer may also be referred to as a consumer. An important component of an SLA is the service level. The service level describes an agreed quality of service (QoS) and contains information about service characteristics or service requirements. Service requirements may comprise one or more of: delay; data rates; packet loss; coverage; user mobility; service availability; reliability; etc. "The service requirements" may also be referred to as "attributes" of the service.

Standardization bodies such as GSMA and 3GPP deal with SLA requirements to support network slicing.

3GPP has defined a network slice as a logical network, which could span across multiple parts of a wider network, and provide specific network capabilities and network characteristics. A network slice must support a contracted SLA.

Currently, Generic Network Slice Template (GST) defined by GSMA is a set of attributes that can characterise a type of network slice. GST is generic and is not tied to any specific network deployment. However, a GST filled with values, known as Network Slice Type (NEST) can be used to create a Network Slice Instance.

There is also a Service Profile of a Network Slice defined in 3GPP Network Resource Model (NRM), in 3GPP TS 28.541. TS 28.541 represents service requirements on a Network Slice instance. The Service Profile is mapped from NEST and used to derive resource requirements to support the service requirement of the network slice.

It is the responsibility of the Service Provider to control whether requirements for service on a related slice are being fulfilled for a given customer.

In existing GST, NEST and Service Profile, attributes (or service requirements) are defined to reflect the service requirements of a Network Slice. Referring back to FIG. 1, a Network Slice Management Function (NSMF) 105 or Network Slice Subnet Management Function (NSSMF) 107 allocate resources to try to satisfy each service requirement equally.

However, in practice there could be conflict between two or more service requirements. Such conflict may block network slice allocation/update, or trigger an unnecessary reconfiguration of the resource. This could cause an unexpected result to a network slice consumer and violate Service Level Agreement (SLA). This could also cause instability of the operator network. Therefore, under constantly changing network conditions and limited network resources, it may be difficult to plan how much resource is required to fulfil all service agreements. Resource under-sizing can lead to conflicts and dead-locks during system operation. Resource over-sizing is not economic from a business point of view, and is wasteful. Furthermore, on the radio interface as well as in a transport network, data delivery can be affected by several factors. For example data packets can be dropped by networking devices for several reasons. For example congestion on link capacity can occur, data in wireless environment can be corrupted, latency can be built up over time or "jitter" (difference in packet inter-arrival time) can get too high.

In situations where more resources are required or requested than available, it may be difficult or impossible to guarantee a promised quality of service to every customer.

It is identified in the present disclosure that in order to offer a best possible service quality, there is a need to know how to handle services of numerous customers in an optimal way when the network is affected, for example by bottlenecks.

Thus the present disclosure introduces an indicator of individual service attributes. The indicator may be referred to as a Tolerance Indicator (TI). The TI of individual service attributes allows optimal resource handling, especially in critical network situations.

According to examples the attributes (or service requirements) comprise SLA attributes (or service requirements). That is the TI may indicate a tolerance to a level or standard of specific attributes. In other words the TI may provide an indication of relative importance of SLA attributes. That is the TI may indicate which SLA attributes a customer is ready to accept as not fulfilled (i.e. not meeting a desired level) and which SLA attributes a customer requires to be fulfilled (i.e. must meet a desired level).

In examples, the TI is assigned to service requirement related attributes in the Service Profile defined in 3GPP TS 28.541. This will be propagated to service requirement related attributes in Slice Profile defined in 3GPP TS 28.541, and derived relevant resource requirement.

The TI of particular SLA attributes defines how far the customer declares or specifies a tolerance to violation of SLA. In other words, the TI defines how important compliance with a particular SLA attribute is in a critical network situation, where network resource is limited. In some examples the TI can define a duration for which violation will be tolerated.

In examples the TI helps to improve resource allocation or reallocation during network critical situations. The TI can help to avoid unnecessary network reconfiguration which may have a high risk of violation of another SLA.

Knowledge of importance of particular SLA attributes may allow exact or more accurate estimation of consequences of a violation, and therefore may allow an estimate of less critical reconfiguration, or allow the procedure to be moved in time to avoid reconfiguration.

The TI addresses both network bottleneck problems in case of network failures leading to contract violation and resource allocation/reallocation.

Having the TI associated with service attributes can avoid premature decisions and/or premature actions. Reconfiguration procedures resolving critical situation can be costly, they are always speculative and thus they do not always bring expected effects. Reconfigurations can also have unintended consequences of violating other SLAs.

In a congestion situation where the network condition degrades, the network service provider (NSP) has more decision flexibility of how to proceed with customers' data by using the TI. For example for one service data traffic can be increased, whereas another service can be slowed with increased delay. Thus, TI moves NSP decision from the speculative to the understood.

Therefore, the TI increases an NSP's freedom of choice of how to handle traffic data during congestion. The TI gives the NSP the possibility of more flexibility in decision making, and allows network reconfiguration procedures that pose inherent risk and are subject to a number of uncertainties to be avoided.

Knowledge of real customers' needs may lead to slice optimal instantiation, configuration, reconfiguration and scaling.

In examples the TI can define any one or more of the following:
1. tolerance range of attribute i.e. to what extent deviation from an agreed service level (e.g. a value) for an attribute is allowed
2. tolerance duration of non-compliance of an attribute with SLA
3. condition/compensation for the tolerance. For example this could be compensation to the customer.

In some examples, agreement of TI for a particular SLA can be combined with a discount of service price for the customer, and can therefore also avoid penalty fees for the Service Provider.

In some examples the TI can be incorporated in to the common properties of service requirement related attributes, as shown in Table 1 and Table 2 below where M=mandatory; O=optional, T=true and F=false.

TABLE 1

| Attribute name | Support Qualifier | isReadable | isWritable | isInvariant | isNotifyable |
| --- | --- | --- | --- | --- | --- |
| category | M | T | F | F | T |
| tagging | M | T | F | F | T |
| exposure | M | T | F | F | T |
| appliedNSSTypeList | M | T | F | F | T |
| toleranceIndicator | O | T | T | F | T |

Table 1 shows individual service attributes added to each service requirement attribute, i.e. SLA attribute. Therefore as shown in Table 1, for each attribute the following information is stored: category; tagging; exposure; applied NSSTypeList; tolerance indicator. In some practical examples (and as shown in Table 1) all the attributes are mandatory, except the TI which is optional (as shown by the support qualifier column "O"—optional). In Table 1 "Writable" means that both consumer and provider can update the attribute. "Invariant" means that the attribute value is set at object creation time and cannot be changed under the specified conditions. "Notifyable" identifies if a notification shall be sent in case of a value change.

TABLE 2

| Attribute name | Support Qualifier | isReadable | isWritable | isInvariant | isNotifyable |
|---|---|---|---|---|---|
| tolerantRange | O | T | T | F | T |
| tolerantDuration | O | T | T | F | T |
| condition | O | T | T | F | T |

Therefore as shown in Table 2, the following aspects of an attribute may be taken in to account when determining a customer's tolerance: tolerant range (i.e. permissible extent of variation from agreed level); tolerant duration (for how long deviation from the agreed level can be tolerated); condition. To set "isWritable" to True for all three attributes in Table 2 allows more flexibility for both parties (provider and customer). However this can be changed, in some examples. It will also be appreciated that the property values provided in Table 2 are examples only, and may differ in other examples. In some examples the "condition" attribute defines what compensation can be offered to network slice consumers if the consumers accept a compromised service requirement in specific range, time and duration. For example, for service requirement "Downlink throughput per slice", if 100 MBps is agreed and this will not be delivered in the tolerable time of, e.g. 5 minutes, the NSP will pay to the NSC x$ per 1 MBps below 100 MBps. So, the condition can be set to "x$ per 1 MBps" (where the amount x can of course vary).

There now follows explanation of an example implementation of the tolerance indicator (TI).

During a slice lifecycle, NSP checks SLA fulfilment of customer services. This check may be performed periodically or in response to an event (e.g. indication received of increased network traffic). In case a service attribute has reached or nearly reached a critical value (e.g. is getting close to non-compliance with SLA), the NSP checks the Tolerance Indicator of one or more customers for the attribute. In case the attribute is set to "tolerable", NSP waits until the end of the event causing the problem. The NSP can then control the situation. If the situation does not improve (e.g the situation reaches a tolerable limit), the NSP may act to improve the situation.

If the situation does improve (e.g. the attribute is no longer close to a critical value), the NSP has avoided unnecessary work, costs and risk.

Figure 2:
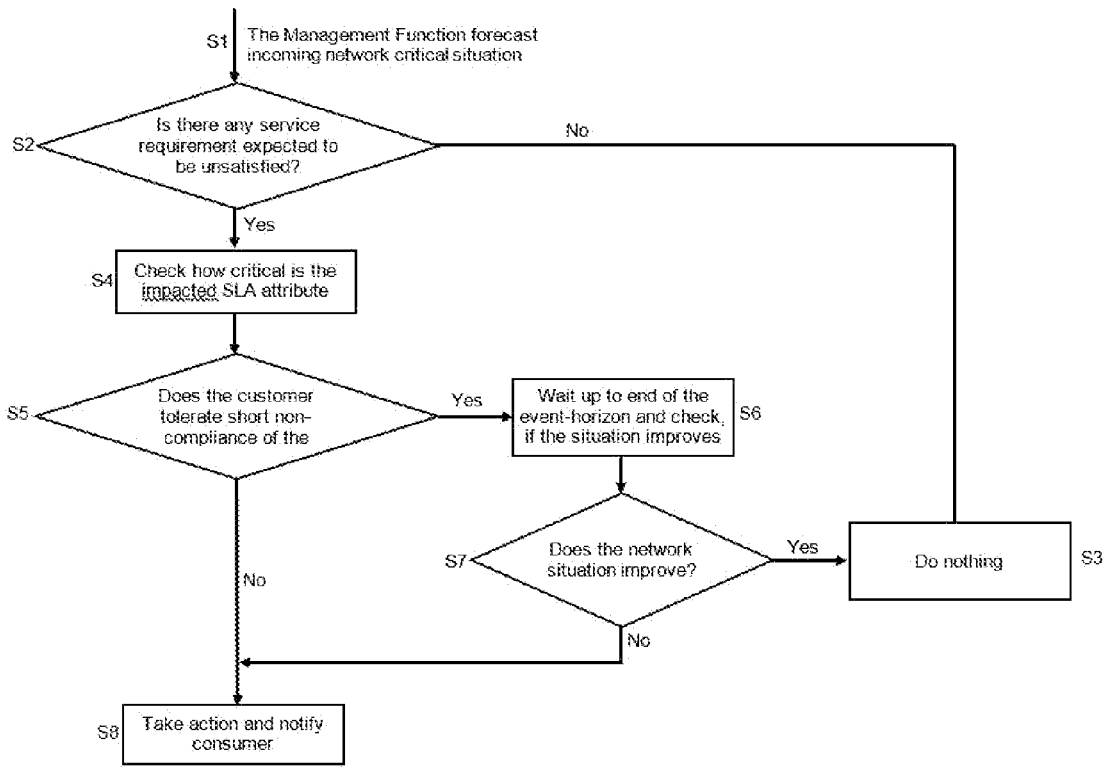
FIG. 2 is a flow chart of a method according to an example.

The method shown schematically with respect to FIG. 2 is described below in more detail. In some examples the procedure of the method of FIG. 2 is carried out in a network apparatus. In some examples the procedure is carried out by a Management Function (MF) which can be part of the network apparatus. In some examples the network apparatus is located in the management system.

At S1, the MF forecasts an incoming network critical situation (or determines that such a critical situation is present). In other words the MF determines a lack of resource or an impending lack of resource for one or more service requirements (or attributes) of one or more services.

As shown at S2, the MF determines whether any service requirement is expected to be unsatisfied. For example the MF determines whether the situation will cause an attribute to be at or approaching a level that would not comply with an SLA.

If the answer at S2 is "No", then the flow proceeds to S3 i.e. do nothing.

If on the other hand the answer at S2 is "yes", then the flow proceeds to S4 where it is determined how critical the impacted SLA attribute is.

In more detail, as shown at S5 it is determined whether the customer(s) can tolerate non-compliance of the attribute. In other words this involves determining whether one or more customers can tolerate con-compliance with the agreed level of service. In some examples this involves reviewing or looking-up TIs of respective customer(s). Therefore it may be considered that the MF is configured to look up a tolerance indicator for one or more customers when determining whether one or more customers can tolerate non-compliance with the agreed level of service. In some examples it may be considered that the tolerance indicator is associated with one or more service requirements (attributes). In some examples there may be multiple TIs for multiple respective service requirements. In some examples, S5 involves determining a duration for which non-compliance can be tolerated.

If the determination at S5 is "Yes" (i.e. non-compliance can be tolerated for a period of time), then the flow proceeds to S6. At S6, the MF waits to see if the situation improves. In FIG. 2 the "event horizon" may be considered to be the upper tolerance limit. Therefore it may be considered that the MF is configured to allow non-compliance with the agreed level of service for those customers that can tolerate the non-compliance The flow then proceeds to S7, where it is determined if the situation has improved.

If the determination at S7 is "Yes", then the flow proceeds to S3 (do nothing).

If on the other hand the determination at S7 is "No", the flow proceeds to S8 where action is taken. For example resource reconfiguration may be carried out. The customer may also be notified. Therefore it may be considered that the MF is configured to prevent non-compliance with the agreed level of service for those customers that cannot tolerate the non-compliance.

Figure 3:
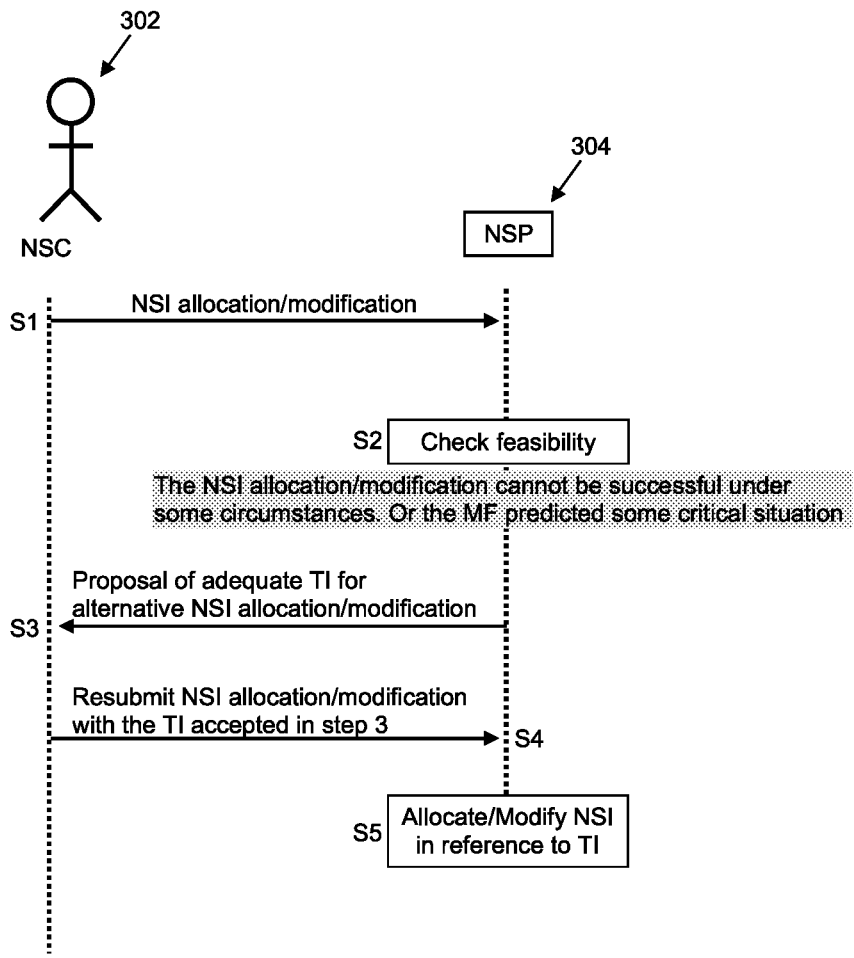
FIG. 3 is a signalling diagram schematically showing an exemplary procedure for slice modification.

FIG. 3 shows an exemplary procedure for a slice modification request initiated between a Network Slice Consumer (NSC) 302 and a Network Slice Provider (NSP) 304.

As shown at S1, the Network Slice Provider (NSP) 304 receives a network slice instance (NSI) allocation/modification request from Network Slice Consumer (NSC) 302.

At S2, the NSP 304 invokes the feasibility check procedure based on the new network slice related requirements, to check whether it is feasible to meet those requirements.

In some examples the feasibility check is in some way negative. For example it is determined that the NSI allocation/modification cannot be successful under some circumstances, or the NSP predicts some critical situation could happen after allocation/modification.

Following the feasibility check, at S3 the NSP 304 proposes some values of a Tolerance Indicator (TI) in response, which can assist with satisfactory NSI allocation/modification.

The NSC can choose whether to accept or not accept the TI proposal.

In the example of FIG. 3, the NSC accepts the proposed TI, as shown at S4. The NSC 302 accepts the TI values and recalls management service of NSP 304 to allocate/modify a NSI with the TI values.

At S5 the NSP 304 allocates/modifies the slice in reference to the TI.

It will be understood that the Tolerance Indicator may contribute to one or more of the following:
- helps addres both network bottlenecks problem in case of network failures leading to contract violation and resource allocation/reallocation,
- allows slice optimal instantiation, configuration, reconfiguration and scaling,
- avoids unnecessary network reconfiguration which can have a high risk on violation of another SLA,
- allows exact or accurate estimation of consequences of SLA violation,
- allows estimation of less critical reconfiguration or allows the procedure to be moved in time and avoids reconfiguration,
- has advantageous business aspect for the NSP in case of avoidance of penalty fees,
- has advantageous business aspect for the NSC: Agreement of Tolerance Indicator for particular SLA can be combined with discount of service price;
- increases decision flexibility how to proceed customer(s) data
- moves service provider (SP) decision from speculative into known.

Figure 4:
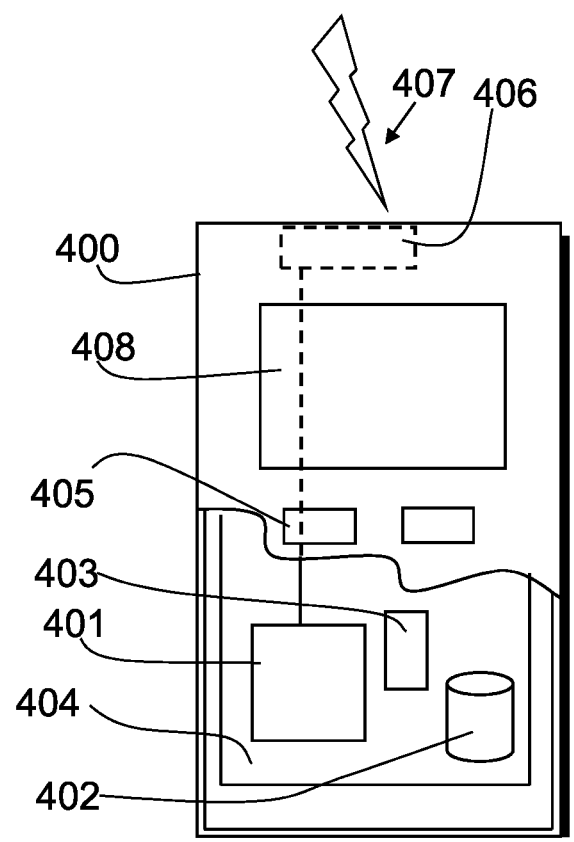
FIG. 4 schematically shows an example of a communication device.

A possible wireless communication device will now be described in more detail with reference to FIG. 4 showing a schematic, partially sectioned view of a communication device 400. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. In the present teachings the terms UE or "user" are used to refer to any type of wireless communication device.

The wireless device 400 may receive signals over an air or radio interface 407 via appropriate apparatus for receiving and may transmit signals via appropriate apparatus for transmitting radio signals. In FIG. 4 transceiver apparatus is designated schematically by block 406. The transceiver apparatus 406 may be provided for example by means of a radio part and associated antenna arrangement. The antenna arrangement may be arranged internally or externally to the wireless device.

A wireless device is typically provided with at least one data processing entity 401, at least one memory 402 and other possible components 403 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 404. The user may control the operation of the wireless device by means of a suitable user interface such as key pad 405, voice commands, touch sensitive screen or pad, combinations thereof or the like. A display 408, a speaker and a microphone can be also provided. Furthermore, a wireless communication device may comprise appropriate connectors (either wired or wireless) to other devices and/or for connecting external accessories, for example hands-free equipment, thereto.

Figure 5:
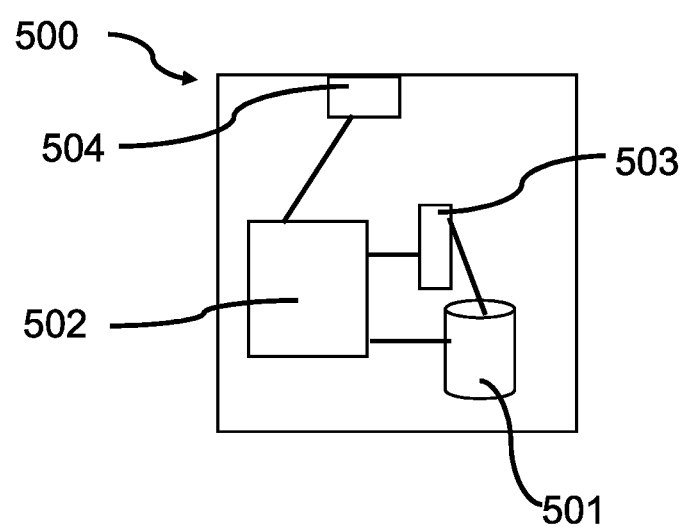
FIG. 5 schematically shows an example of a control apparatus.

FIG. 5 shows an example of a control apparatus for a communication system, for example to be coupled to and/or for controlling a station of an access system, such as a RAN node, e.g. a base station, gNB, a central unit of a cloud architecture or a node of a core network such as an MME or S-GW, a scheduling entity such as a spectrum management entity, or a server or host. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 500 can be arranged to provide control on communications in the service area of the system. The control apparatus 500 comprises at least one memory 501, at least one data processing unit 502, 503 and an input/output interface 504. Via the interface the control apparatus can be coupled to a receiver and a transmitter of the base station. The receiver and/or the transmitter may be implemented as a radio front end or a remote radio head. For example the control apparatus 500 or processor 501 can be configured to execute an appropriate software code to provide the control functions.

Figure 6:
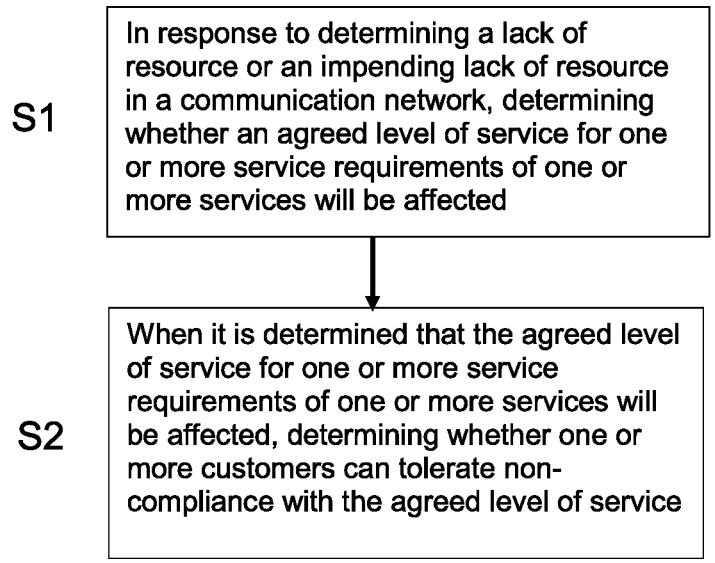
FIG. 6 is a flow chart schematically illustrating a method according to an example.

FIG. 6 is a flow-chart of a method according to an example. The procedure of FIG. 6 is viewed from the perspective of an apparatus. The apparatus may for example be a network apparatus. The apparatus may for example comprise a management function (MF).

At S1, the method comprises, in response to determining a lack of resource or an impending lack of resource in a communication network, determining whether an agreed level of service for one or more service requirements of one or more services will be affected.

At S2, when it is determined that the agreed level of service for one or more service requirements of one or more services will be affected, determining whether one or more customers can tolerate non-compliance with the agreed level of service.

Figure 7:
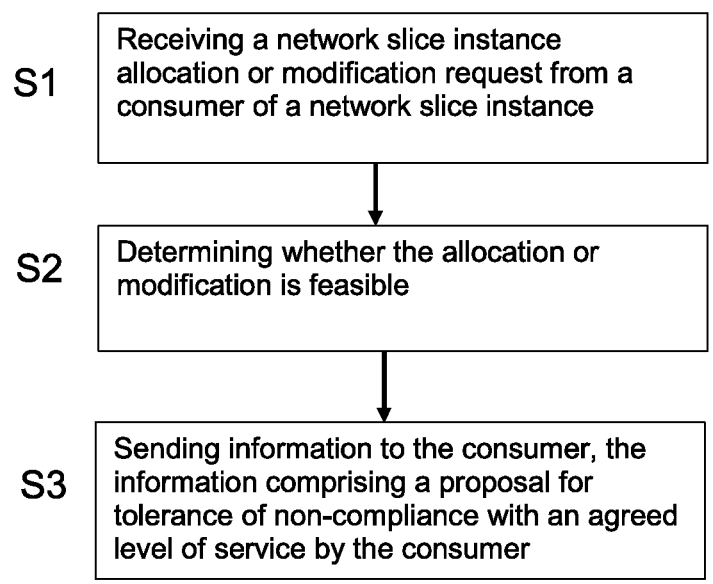
FIG. 7 is a flow chart schematically illustrating a method according to an example.

FIG. 7 is a flow-chart of a method according to an example. The procedure of FIG. 7 is viewed from the perspective of an apparatus. The apparatus may for example be a network apparatus. The apparatus may for example comprise a NSP apparatus.

At S1, the method comprises receiving a network slice instance allocation or modification request from a consumer of a network slice instance.

At S2, the method comprises determining whether the allocation or modification is feasible.

At S3, the method comprises sending information to the consumer, the information comprising a proposal for tolerance of non-compliance with an agreed level of service by the consumer.

Figure 8:
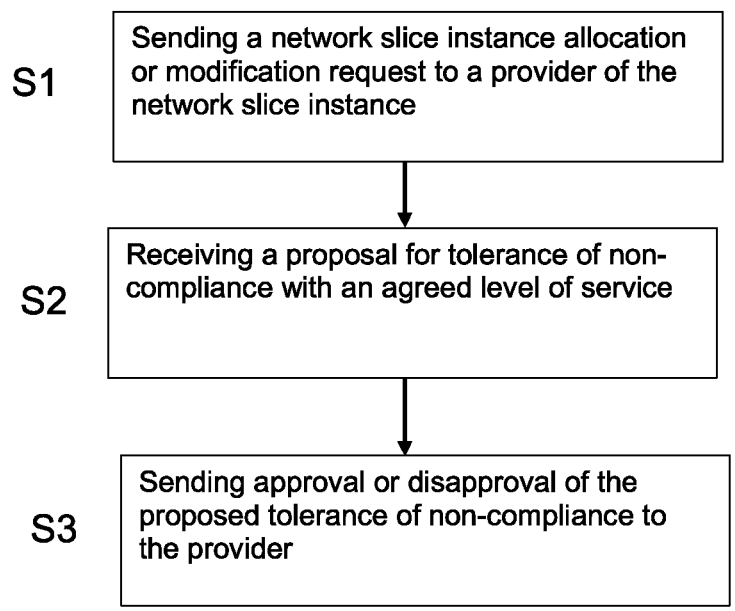
FIG. 8 is a flow chart schematically illustrating a method according to an example.

FIG. 8 is a flow-chart of a method according to an example. The procedure of FIG. 8 is viewed from the perspective of an apparatus. The apparatus may for example comprise a NSC apparatus.

At S1, the method comprises sending a network slice instance allocation or modification request to a provider of the network slice instance.

At S2, the method comprises receiving a proposal for tolerance of non-compliance with an agreed level of service.

At S3, the method comprises sending approval or disapproval of the proposed tolerance of non-compliance to the provider.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program procedures, or interconnected logic circuits, blocks and functions, or a combination of program procedures and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

What is claimed is:

1. An apparatus, comprising:
   at least one processor; and
   at least one memory including computer program code,
      the at least one memory and computer program code are configured to, with the at least one processor, cause the apparatus to perform the following:
   determine an impending lack of resource, in a communication network, for one or more service requirements of one or more services;

in response to determining the impending lack of resource in the communication network, determine that an agreed level of service for the one or more service requirements of the one or more services will be unsatisfied as a result of the impeding lack of resource;

upon the determination that the agreed level of service for the one or more service requirements of the one or more services will be unsatisfied, determine whether one or more customers can tolerate non-compliance with the agreed level of service by identifying a tolerance indicator associated with the one or more customers, the tolerance indicator indicating how far tolerance to violation of the agreed level of service for the one more service requirements of the one or more services is acceptable, the tolerance indicator further indicating a tolerance range for the agreed level of service, a tolerance duration of non-compliance with the agreed level of service, and compensation for accepting non-compliance with the agreed level of service, and wherein the one or more service requirements comprise data rate, packet loss, coverage, user mobility, service availability, and reliability; and based on the determination that the non-compliance with the agreed level of service for the one or more service requirements of the one or more services will not be tolerated, carry out resource reconfiguration to prevent non-compliance with the agreed level of service for the one or more customers that cannot tolerate the non-compliance.

2. The apparatus according to claim 1, wherein the at least one memory and computer program code are further configured, with the at least one processor, to cause the apparatus to perform allowing non-compliance with the agreed level of service for those customers that can tolerate the non-compliance as indicated by the tolerance indicator.

3. The apparatus according to claim 1, wherein the at least one memory and computer program code are further configured, with the at least one processor, to cause the apparatus to perform preventing non-compliance with the agreed level of service for those customers that cannot tolerate the non-compliance as indicated by the tolerance indicator.

4. The apparatus according to claim 3, wherein the tolerance indicator is further associated with one or more of the one or more service requirements of the one or more services.

5. The apparatus according to claim 4, wherein the communication network comprises: network slices; network slice subnets; network services; network functions; and network function services.

6. The apparatus according to claim 1, wherein the apparatus comprises an entity of a network service provider.

7. A method, comprising:
determining an impending lack of resource, in a communication network, for one or more service requirements of one or more services;

in response to the determination of the impending lack of resource in the communication network, determining whether that an agreed level of service for the one or more service requirements of the one or more services will be affected;

upon the determination that the agreed level of service for the one or more service requirements of the one or more services will be affected, determining whether one or more customers can tolerate non-compliance with the agreed level of service, a tolerance to the non-compliance with the agreed level of service is determined based on looking up a tolerance indicator associated with the one or more customers, the tolerance indicator indicates how far tolerance to violation of the agreed level of service for the one more service requirements of the one or more services is acceptable, wherein the tolerance indicator includes a tolerance range for the agreed level of service, a tolerance duration of non-compliance with the agreed level of service, and compensation for accepting non-compliance with the agreed level of service, and wherein the one or more service requirements comprise data rate, packet loss, coverage, user mobility, service availability, and reliability; and carrying out resource allocation or reallocation, to prevent non-compliance with the agreed level of service for the one or more customers, based on the determination that the agreed level of service for the one or more service requirements of the one or more services will be affected.

8. The method according to claim 7, comprising allowing non-compliance with the agreed level of service for those customers that can tolerate the non-compliance as indicated by the tolerance indicator.

9. The method according to claim 7, comprising preventing non-compliance with the agreed level of service for those customers that cannot tolerate the non-compliance as indicated by the tolerance indicator.

10. The method according to claim 7, wherein the tolerance indicator is further associated with one or more of the one or more service requirements.

11. The method according to claim 7, wherein the communication network comprises one or more network slices.

12. The method according to claim 7, carried out by an entity of a network service provider.

13. A non-transitory computer storage medium storing instructions which when run on one or more processors cause program embodied on a non-transitory computer readable medium, said computer program comprising instructions for causing an apparatus to perform the method of claim 7.

* * * * *